Dec. 6, 1932.  C. P. CHAMBERLIN  1,889,773
METHOD OF MAKING ANNULAR OBJECTS
Filed June 8, 1932
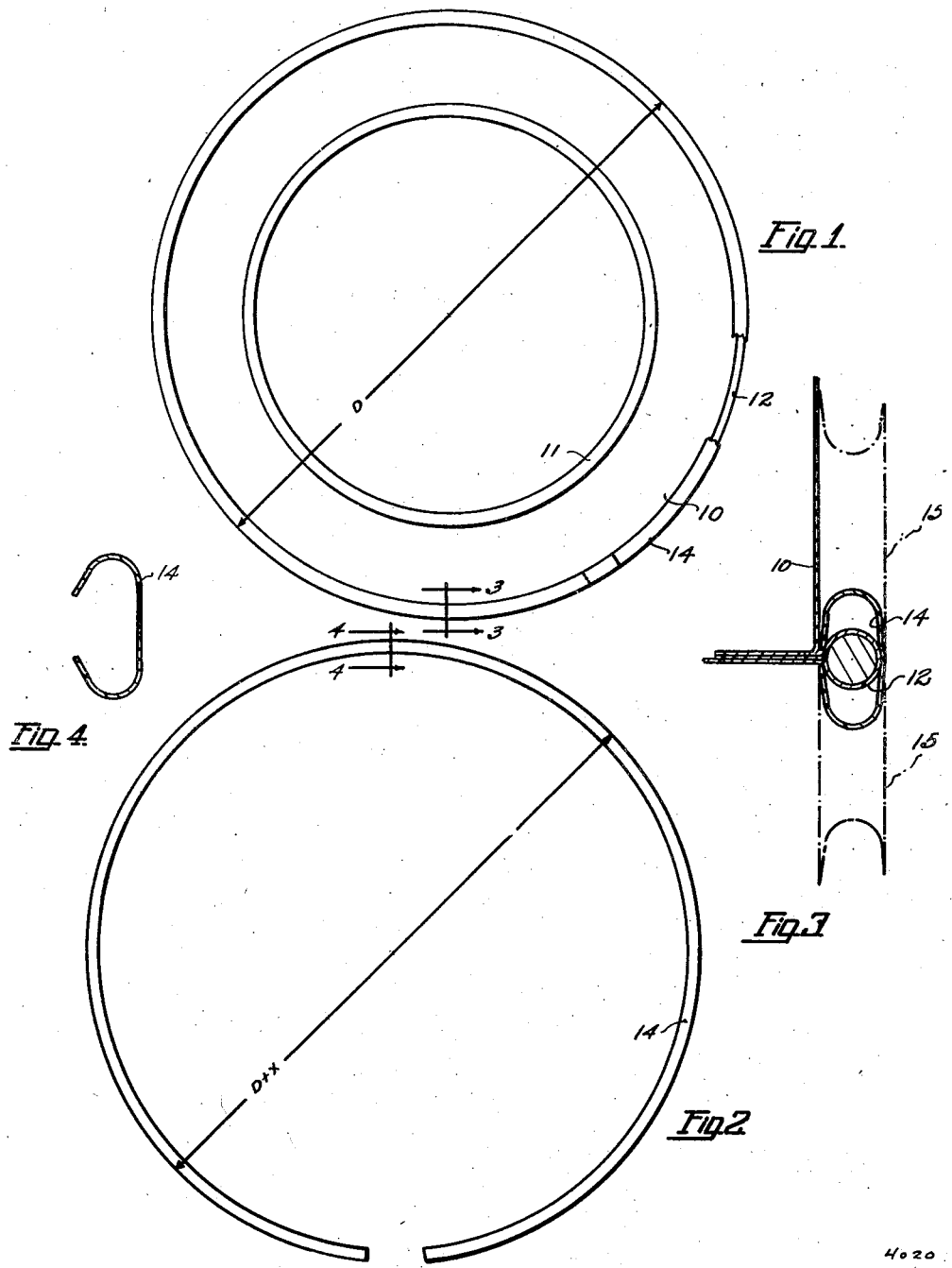
INVENTOR
Clarence P. Chamberlin
BY
Daniel G. Cullen
ATTORNEY Patented Dec. 6, 1932

1,889,773

UNITED STATES PATENT OFFICE

CLARENCE P. CHAMBERLIN, OF DETROIT, MICHIGAN

METHOD OF MAKING ANNULAR OBJECTS

Application filed June 8, 1932. Serial No. 616,137.

This invention relates to a novel method for applying a molding to an annular bead or seam in an object of relatively pliable material.

It is illustrated in the appended drawing in which Fig. 1, shows an annular object, in face view, having a molding applied by the method of the invention, the molding being shown broken away in part.

Fig. 2 shows a molding in the condition it has before it is applied to the object, and Figs. 3 and 4 are sections on lines 3—3 and 4—4 of Figs. 1 and 2 respectively, rolling devices being also shown diagrammatically in Fig. 3.

On the drawing, Fig. 1 shows, in face view, a tire cover having a pliable material face ring 10 provided with seams or beads 11 and 12 forming beaded annuli at the inner and outer edges of the same. The beaded annulus at bead 12 is shown as covered by a molding 14 of C cross section (Fig. 3), and applied by the method of the invention and how to be described.

Before the molding is applied to the bead 12, it is rolled so as to have a tendency to assume a diameter $(D+x)$ slightly greater than the diameter $(d)$ of the beaded annulus of bead 12, the circumferential length of the molding being substantially equal to the circumferential length of the beaded annulus of bead 12.

The molding at this time is open, in cross-section (Fig. 9) to such an extent that it can receive the bead 12.

One end of the molding, in its expanded state and its open cross-section condition is then applied to the annulus of bead 12. The bead 12 and the aforementioned end of the molding is then brought between the separated rolls 15—15 of a conventional pressure rolling machine. The rolls are then moved towards each other and then rotated, thus crimping or rolling the molding onto the bead 12, the molding assuming the cross section of Fig. 3.

This rolling step causes the molding to contract from its original diameter $(D+x)$ to the diameter $(D)$ of the beaded annulus of bead 12, in opposition to the inherent tendency of the molding to expand to its original diameter.

It is preferred to have the molding of a length slightly greater than the circumferential length of the annulus of bead 12, so that when the molding is rolled onto the bead, a slight overlap, indicated by dotted lines in Fig. 1, will be provided.

It is also preferred though not absolutely essential, to roll the molding onto bead 12 in such a manner that the molding will be relatively loose thereon though non-removable therefrom as shown in Fig. 3. The molding is not clinched into the material, and may slide on the bead; this prevents the molding from causing the pliable material of the cover from puckering, binding, etc.

The use of a molding ring having an inherent tendency to expand to a diameter greater than its finished diameter eliminates the tendency of the ring to warp and wave out of a true plane. It has been found that when the ring is so formed as not to have the expanding tendency aforementioned, it warps and waves out of its plane and mars the desired flat appearance of the annular finished line.

Now having described the invention, and embodiments thereof, it will be observed that the same is not to be limited to the specific details shown, but only by the scope of the claims which follow.

What I claim is:

1. The method of applying a molding of C cross section to an annular seam or bead in an object of pliable material which comprises providing a length of the molding substantially equal to the circumferential length of the seamed or beaded annulus, and having an inherent tendency to expand to a diameter greater than the diameter of the seamed or beaded annulus, and applying the molding onto the seam or bead and contracting it to the diameter of the seamed or beaded annulus, in opposition to the inherent tendency of the molding to expand to its original diameter.

2. The method of applying a molding of C cross section to an annular seam or bead in an object of pliable material which comprises providing a length of the molding substantially equal to the length of the seam or bead, and having an inherent tendency to expand to a diameter greater than the diameter of the seamed or beaded annulus, and applying the molding onto the seam or bead and contracting it to the diameter of the seamed or beaded annulus, in opposition to the inherent tendency of the molding to expand to its original diameter, the molding being so loosely applied to the seam or bead that, though non-removable therefrom it does not clinch, bind, or pucker the pliable material.

In testimony whereof I affix my signature.

CLARENCE P. CHAMBERLIN.